(12) United States Patent
Allias et al.

(10) Patent No.: US 11,572,191 B1
(45) Date of Patent: Feb. 7, 2023

(54) PROPELLER-TYPE PROPULSION SYSTEM FOR AN AIRCRAFT

(71) Applicants: Airbus Operations SAS, Toulouse (FR); Airbus SAS, Blagnac (FR); Airbus Operations S.L., Getafe (ES)

(72) Inventors: Jean-François Allias, Toulouse (FR); Franck Alvarez, Toulouse (FR); Pascal Pome, Toulouse (FR); Nicolas Jolivet, Toulouse (FR); Rémi Amargier, Toulouse (FR); Salvatore Demelas, Getafe (ES); Norberto Simionato Neto, Taufkirchen (DE); Benedikt Bammer, Taufkirchen (DE); Damien Mariotto, Marignane (FR)

(73) Assignees: AIRBUS OPERATIONS SAS, Toulouse (FR); AIRBUS SAS, Blagnac (FR); AIRBUS OPERATIONS S.L., Getafe (ES)

( * ) Notice: Subject to any disclaimer, the term of this patent is extended or adjusted under 35 U.S.C. 154(b) by 0 days.

(21) Appl. No.: 17/866,050

(22) Filed: Jul. 15, 2022

(30) Foreign Application Priority Data

Jul. 19, 2021 (FR) ...................................... 2107763

(51) Int. Cl.
*B64D 35/02* (2006.01)
*B64D 35/08* (2006.01)
*B64D 27/24* (2006.01)

(52) U.S. Cl.
CPC ............. *B64D 35/02* (2013.01); *B64D 27/24* (2013.01); *B64D 35/08* (2013.01)

(58) Field of Classification Search
CPC ......... B64D 35/02; B64D 27/24; B64D 35/08
See application file for complete search history.

(56) References Cited

U.S. PATENT DOCUMENTS

| 4,955,561 A | 9/1990 | Seefluth |
| 8,821,200 B2 * | 9/2014 | Krackhardt ............ B63H 25/42 |
| | | 440/75 |

(Continued)

FOREIGN PATENT DOCUMENTS

| DE | 3629867 A | 3/1988 |
| EP | 2727834 A2 | 5/2014 |

(Continued)

OTHER PUBLICATIONS

French Search Report; priority document.

*Primary Examiner* — Hoang M Nguyen
(74) *Attorney, Agent, or Firm* — Greer, Burns & Crain, Ltd.

(57) ABSTRACT

A propeller-type propulsion system for aircraft comprising a propeller, a plurality of electric motors and a gearbox. The gearbox has an output shaft onto which the propeller is mechanically coupled, and has an input shaft onto which the plurality of electric motors is mechanically coupled, the input shaft being off-center with respect to the output shaft. All of the electric motors are mechanically coupled one after the other along the input shaft such that the electric motors are at least partially integrated into a space, on the opposite side of the gearbox from the propeller, that is left free owing to the input shaft and the output shaft being off-center with respect to one another. As a result, the diameter of the propulsion system, in a plane perpendicular to the axis of rotation of the propeller, is reduced. This improves the aerodynamics and the fuel consumption of the aircraft.

17 Claims, 2 Drawing Sheets

(56) References Cited

U.S. PATENT DOCUMENTS

| | | |
|---|---|---|
| 10,364,037 B2 | 7/2019 | Armstrong et al. |
| 2003/0071167 A1* | 4/2003 | Thomassey ......... B64C 29/0033 244/6 |
| 2010/0021295 A1 | 1/2010 | Perkinson et al. |
| 2012/0214642 A1 | 8/2012 | Ehinger et al. |
| 2017/0190435 A1 | 7/2017 | Kobayashi et al. |
| 2018/0251226 A1* | 9/2018 | Fenny ................ B64D 27/24 |
| 2019/0118943 A1* | 4/2019 | Machin ............... B64C 27/473 |
| 2020/0361622 A1 | 11/2020 | Groninga et al. |
| 2021/0039796 A1 | 2/2021 | Hirabayashi et al. |
| 2021/0039802 A1* | 2/2021 | Chesneau ................. F02K 3/06 |
| 2021/0078719 A1 | 3/2021 | Thomas et al. |
| 2021/0094694 A1 | 4/2021 | Seminel |

FOREIGN PATENT DOCUMENTS

| | | |
|---|---|---|
| EP | 3097202 B1 | 10/2018 |
| EP | 3738887 A1 | 11/2020 |
| WO | 2017114643 A1 | 7/2017 |

\* cited by examiner

PROPELLER-TYPE PROPULSION SYSTEM FOR AN AIRCRAFT

CROSS-REFERENCES TO RELATED APPLICATIONS

This application claims the benefit of the French patent application No. 2107763 filed on Jul. 19, 2021, the entire disclosures of which are incorporated herein by way of reference.

FIELD OF THE INVENTION

The present invention relates to a propeller-type propulsion system for an aircraft, which comprises a plurality of electric motors that together turn the propeller.

BACKGROUND OF THE INVENTION

Electric motors can be used to drive in rotation a propeller of a propulsion system, and thus move an aircraft both on the ground and in flight.

Since commercial aircraft are relatively heavy vehicles, significant propulsion energy is needed to move them. Thus, aircraft typically have multiple propulsion systems, that is to say multiple propeller-type engines. In spite of this, each propulsion system must typically have multiple electric motors which act together to turn the propeller.

A gearbox is used for that purpose. Since each electric motor has an output shaft (driveshaft), the gearbox provides mechanical coupling between the output shafts of these electric motors and an output shaft of the gearbox, which is secured to the propeller. Thus, the gearbox has the same number of input shafts as there are electric motors arranged in parallel. One drawback of this arrangement is that, since the motors are mounted in parallel, the propulsion system is bulky both in terms of height and in terms of width. In other words, the diameter of the propulsion system, in a plane perpendicular to the axis of rotation of the propeller, is large. This impairs the aerodynamics of the aircraft and increases its fuel (e.g., hydrogen) consumption.

It is therefore desirable to provide a solution by which it is possible to improve the aerodynamics and fuel consumption of the aircraft.

SUMMARY OF THE INVENTION

The present invention therefore proposes a propeller-type propulsion system for an aircraft, comprising: a propeller; a plurality of electric motors; a gearbox having an output shaft onto which the propeller is mechanically coupled, and having an input shaft onto which the plurality of electric motors is mechanically coupled, the input shaft being off-center with respect to the output shaft. Moreover, all of the electric motors of the plurality of electric motors are mechanically coupled one after the other along the input shaft in such a way that the electric motors are at least partially integrated into a space, on the opposite side of the gearbox from the propeller, that is left free owing to the input shaft and the output shaft being off-center with respect to one another. As a result, the electric motors are not mounted in parallel and the diameter of the propulsion system, in a plane perpendicular to the axis of rotation of the propeller, is reduced. This improves the aerodynamics and the fuel consumption of the aircraft.

According to one particular embodiment, each electric motor comprises an output shaft that is parallel to the input shaft and comprises a first gearwheel mechanically coupled to a second gearwheel on the input shaft, the first gearwheel and the second gearwheel being coplanar.

According to one particular embodiment, each electric motor comprises an output shaft that is perpendicular to the input shaft and comprises a first conical gearwheel mechanically coupled to a second conical gearwheel on the input shaft, the first conical gearwheel and the second conical gearwheel therefore being in perpendicular respective planes.

According to one particular embodiment, the electric motors are arranged in a line.

According to one particular embodiment, the electric motors are arranged on either side of a vertical plane passing through the axis of rotation of the input shaft.

According to one particular embodiment, the electric motors are mechanically coupled in a freewheel arrangement with the input shaft.

According to one particular embodiment, the input shaft is mechanically coupled in a freewheel arrangement with the output shaft.

According to one particular embodiment, the propeller-type propulsion system further comprises a housing for controlling the orientation of the propeller blades, this housing being placed in continuation of the output shaft, on the opposite side of the gearbox from the propeller.

According to one particular embodiment, the electric motors are powered by fuel cells.

The present document also proposes an aircraft comprising at least one propeller-type propulsion system as mentioned hereinabove in any one of its embodiments.

BRIEF DESCRIPTION OF THE DRAWINGS

The features of the invention mentioned above, along with others, will become more clearly apparent on reading the following description of at least one exemplary embodiment, the description being given with reference to the appended drawings, in which.

DETAILED DESCRIPTION OF THE PREFERRED EMBODIMENTS

Figure 1:
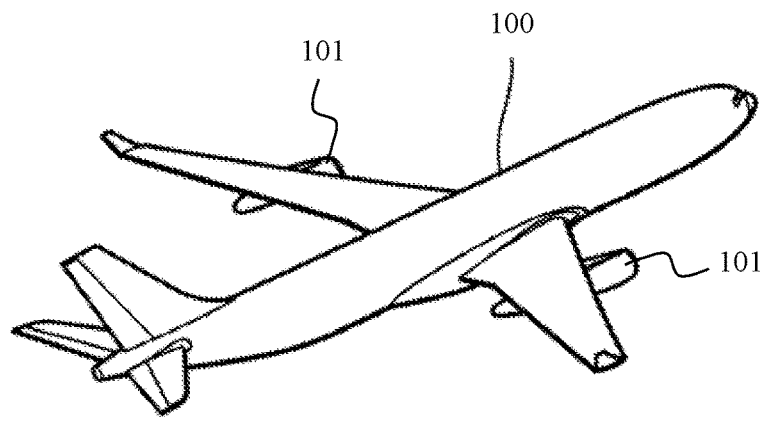
FIG. 1 shows, schematically and in perspective, an aircraft equipped with at least one propeller-type propulsion system.

FIG. 1 shows, schematically and in perspective, an aircraft 100 equipped with at least one propeller-type propulsion system 101. By way of illustration, the aircraft 100 of FIG. 1 comprises two propeller-type propulsion systems 101 respectively mounted on each of the wings of the aircraft 100. The aircraft 100 may comprise a different number of propeller-type propulsion systems 101.

When used here, the term "length" refers to a horizontal dimension when the aircraft 100 is on the ground, and the term "height" refers to a vertical dimension when the aircraft 100 is on the ground.

Figure 2:
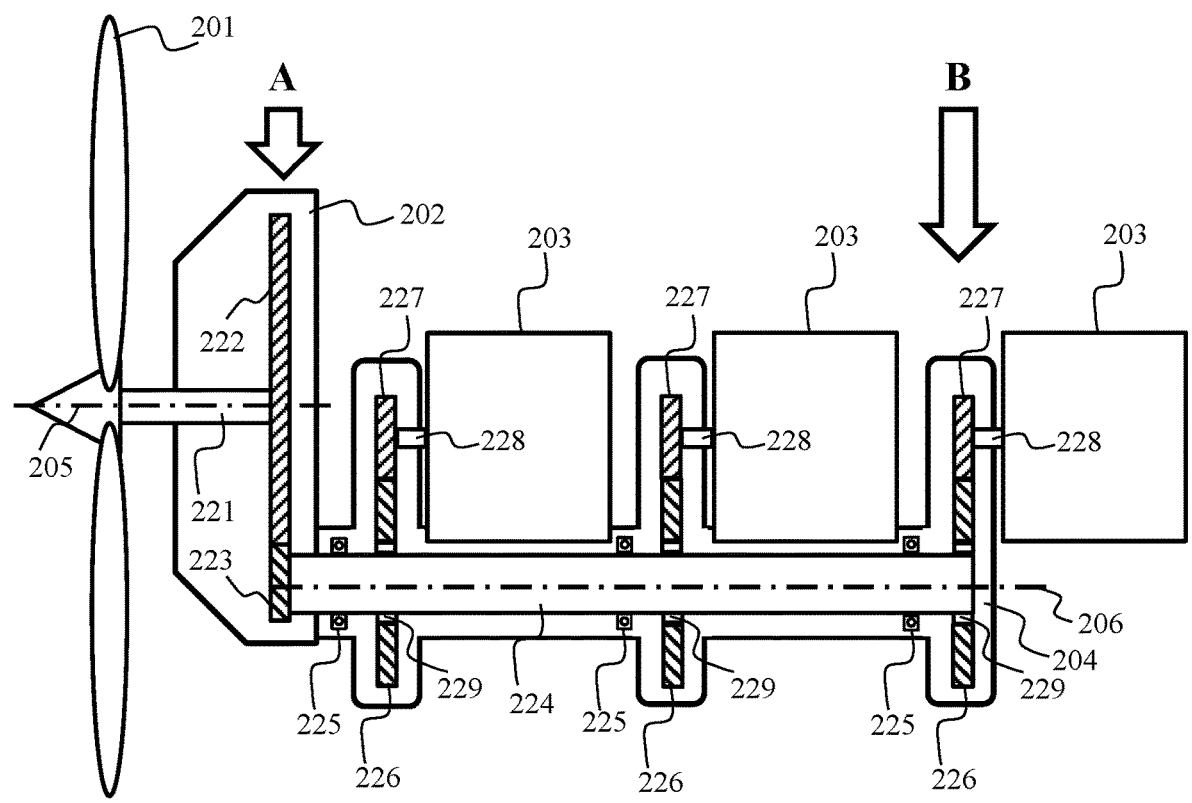
FIG. 2 shows, schematically and in simplified section, an arrangement of such a propeller-type propulsion system.

FIG. 2 shows, schematically and in simplified section, an arrangement of such a propeller-type propulsion system 101.

The propeller-type propulsion system 101 comprises a propeller 201 and a gearbox 202. The propeller may be a turboprop propeller, as depicted schematically in FIG. 2. However, other propeller configurations may be contemplated without departing from the scope of the invention. Thus, the propeller may correspond to a faired propeller (or "ducted fan"), for example. The gearbox 202 comprises an output shaft 221 to which the propeller 201 is mechanically coupled. As shown in FIG. 2, the propeller 201 is typically mounted at the end of the output shaft 221 so that its axis of rotation is the axis of revolution 205 of the output shaft 221.

The propeller-type propulsion system 101 comprises a plurality of electric motors 203 whose purpose is to turn the propeller 201 via the gearbox 202. For example, each electric motor 203 is powered by one or more fuel cells such as hydrogen cells.

Each electric motor 203 comprises an output shaft 228 that is mechanically coupled to a common input shaft 224 of the gearbox 202. Thus, the plurality of electric motors 203 is mechanically coupled to a single shaft and the electric motors 203 therefore together drive the common input shaft 224.

The common input shaft 224 is parallel to the output shaft 221 and is off-center with respect to the output shaft 221. The common input shaft 224 enters the gearbox 202 on the opposite side from the side from which the output shaft 221 emerges. The gearbox 202 comprises a set of gearwheels 222, 223 that are arranged so as to provide a reduction in rotational speed and so as to bring about the off-center arrangement between the common input shaft 224 and the output shaft 221.

All of the electric motors 203 of the plurality of electric motors 203 are installed, at least in part, in a space behind the gearbox 202 (that is to say, on the other side of the gearbox 202 from the propeller 201) which is left free owing to the common input shaft 224 and the output shaft 221 being off-center with respect to one another. Thus, the plurality of electric motors 203 is at least partially housed in this space that is left free owing to the common input shaft 224 and the output shaft 221 being off-center with respect to one another. The electric motors 203 are mechanically coupled to the common input shaft 224 one after the other along the common input shaft 224. Proceeding in this manner reduces the bulk (in terms of height) of the propeller-type propulsion system 101, which improves the aerodynamics of the aircraft 100. In one particular embodiment, all of the electric motors 203 of the plurality of electric motors 203 are installed entirely in the space behind the gearbox 202.

In the arrangement of FIG. 2, the electric motors 203 are arranged in such a way that their output shafts 228 are parallel to the common input shaft 224. Each output shaft 228 comprises a gearwheel 227 that is mechanically coupled to a gearwheel 226 on the common input shaft 224, the gearwheels 226 and 227 being coplanar.

The electric motors 203 are preferably mechanically coupled in a freewheel arrangement with the common input shaft 224. For example, a freewheel arrangement (which engages in just one direction of rotation) 229 is established where each gearwheel 226 is mounted on the common input shaft 224. According to another example, a freewheel arrangement is established where each gearwheel 227 is mounted on the output shaft 228 of each electric motor 203.

Preferably, the common input shaft 224 is mechanically coupled in a freewheel arrangement with the output shaft 221. For example, a freewheel arrangement is established where the gearwheel 223 is mounted on the common input shaft 224.

In one embodiment, the common input shaft 224 and the sets of gearwheels 226, 227 are arranged in a single casing 204 that is fixed with respect to the gearbox 202. Ball bearings 225, for example, allow the common input shaft 224 to rotate in the casing 204. This simplifies lubrication of these various elements.

This makes it possible to ensure a loading path, with a first anchor point on the gearbox 202 and a second anchor point on a part of the casing 204 that is remote from the gearbox 202, for example a part of the casing 204 that encloses the mechanical coupling of the very last electric motor 203 (with respect to the gearbox 202) to the common input shaft 224, that is to say, the gearwheels 226, 227 of this very last electric motor 203. In other words, the loading path can be ensured with a first anchor point on the gearbox 202 and a second anchor point on a part of the casing 204 that is located between the two electric motors that are furthest from the gearbox 202, as illustrated by arrows A and B in FIG. 2. This limits cantilevering.

The propeller-type propulsion system 101 is preferably self-contained, so as to simplify installation and maintenance thereof, as described in patent document FR3097202A1 or patent document US 2021/0078719 A1, the disclosures of both of which are incorporated herein by reference.

Figure 3:
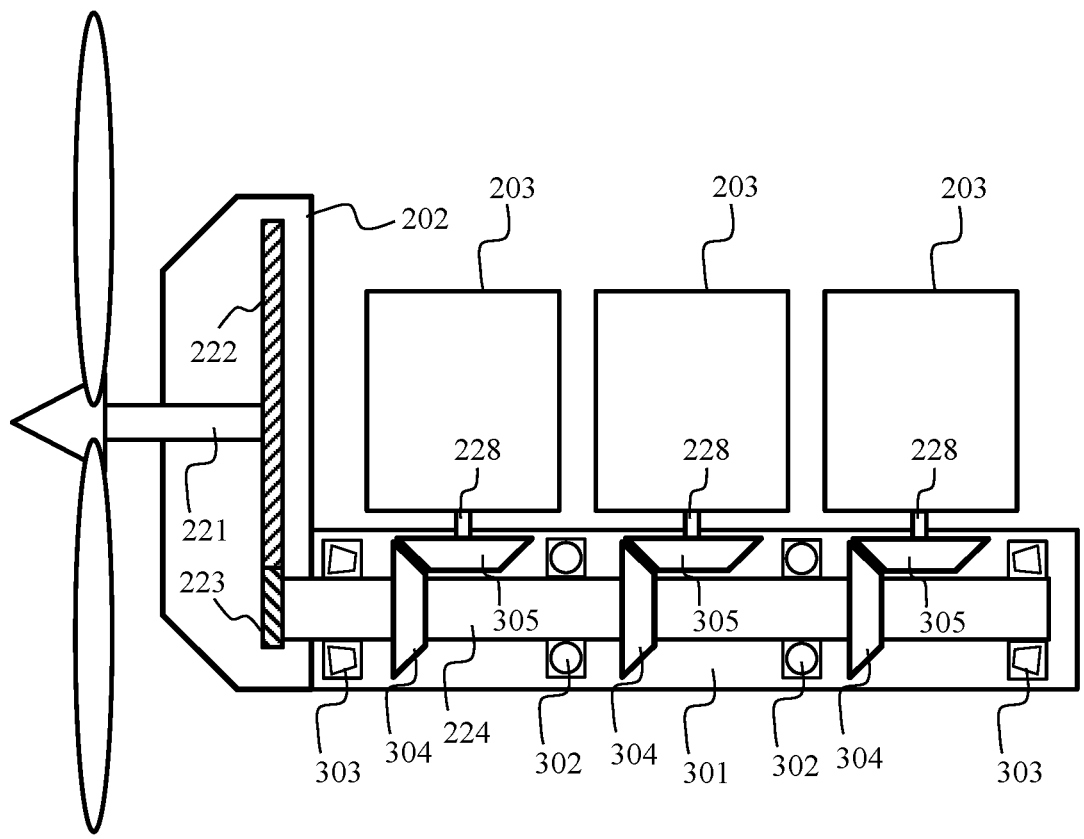
FIG. 3 shows, schematically and in simplified section, another arrangement of such a propeller-type propulsion system.

FIG. 3 shows, schematically and in simplified section, an alternative arrangement of the propeller-type propulsion system 101.

The electric motors 203 are positioned in such a way that their output shafts 228 are perpendicular to the common input shaft 224. Each output shaft 228 comprises a conical gearwheel 305 that is mechanically coupled to a conical gearwheel 304 on the common input shaft 224, the conical gearwheels 304 and 305 therefore being in perpendicular planes.

In one embodiment, the common input shaft 224 and the sets of gearwheels 304, 305 are arranged in a single casing 301.

Furthermore, conical roller bearings 303 can be used in addition to ball bearings 302 so as to react axial and radial loads and allow the common input shaft 224 to rotate in the casing 301.

As in the arrangement of FIG. 2, the loading path can be ensured with a first anchor point on the gearbox 202 and a second anchor point on a part of the casing 204 that is located between the two electric motors that are furthest from the gearbox 202.

Figure 4:
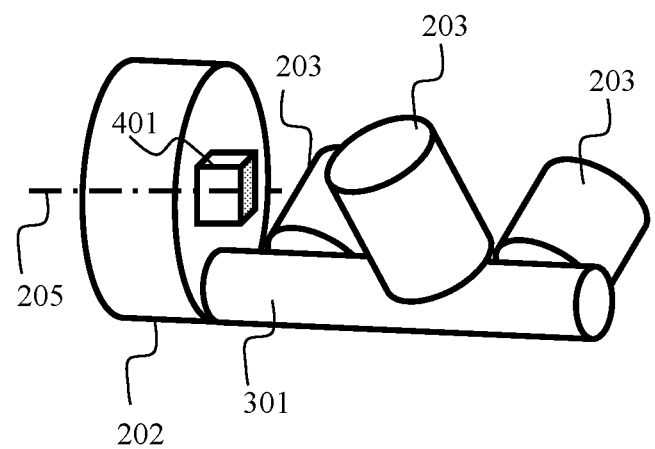
FIG. 4 shows, schematically and in perspective, a particular embodiment of the arrangement of FIG. 3.

In the arrangement of FIG. 3, the electric motors 203 are positioned in a line. A different arrangement, in which the electric motors 203 are positioned on either side of a vertical plane passing through the axis of rotation 206 of the common input shaft 224 can be implemented, resulting in a non-zero angle between the axes of the output shafts 228 of a first set of electric motors 203 and a second set of electric motors 203. Preferably, the electric motors 203 are successively on either side of the vertical plane, as depicted schematically in FIG. 4. Depending on the dimensions of the electric motors 203, this makes it possible to reduce the bulk (in terms of length) of the propeller-type propulsion system 101. This particular arrangement also applies as a variant of the arrangement of FIG. 2 (output shafts 228 of the electric motors 203 parallel to the common input shaft 224).

In one particular embodiment, the propeller-type propulsion system 101 comprises a housing 401 for controlling the orientation ("pitch control") of the blades of the propeller 201. Preferably, the housing 401 is placed in continuation of the output shaft 221, on the opposite side of the gearbox 202 from the propeller 201. If, owing to the arrangement of the very first electric motor 203 behind the gearbox 202, it is impossible to position the housing 401 in this manner, then the housing 401 is positioned so as to minimize as far as possible the offset between the housing 401 and the axis 205 of rotation of the propeller 201.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propeller-type propulsion system for aircraft, having:
   a propeller;
   a plurality of electric motors, each comprising an output shaft;
   a gearbox having an output shaft onto which the propeller is mechanically coupled, and having an input shaft onto which the plurality of electric motors is mechanically coupled, the input shaft being off-center with respect to the gearbox output shaft; and
   wherein all of the electric motors are mechanically coupled one after the other along the input shaft such that the electric motors are entirely installed in a space, on an opposite side of the gearbox from the propeller, that is left free owing to the input shaft and the output shaft being off-center with respect to one another, the electric motors being moreover arranged in such a way that:
       output shafts of the electric motors are parallel to the input shaft, each output shaft comprising a first gearwheel mechanically coupled to a second gearwheel on the input shaft, the first gearwheel and the second gearwheel being coplanar.

2. The propeller-type propulsion system according to claim 1, wherein the electric motors are arranged in a line.

3. The propeller-type propulsion system according to claim 1, wherein the electric motors are arranged on either side of a vertical plane passing through an axis of rotation of the input shaft.

4. The propeller-type propulsion system according to claim 1, wherein the electric motors are mechanically coupled in a freewheel arrangement with the input shaft.

5. The propeller-type propulsion system according to claim 1, wherein the input shaft is mechanically coupled in a freewheel arrangement with the output shaft.

6. The propeller-type propulsion system according to claim 1, further comprising a housing for controlling an orientation of blades of the propeller, this housing being placed in continuation of the output shaft, on the opposite side of the gearbox from the propeller.

7. The propeller-type propulsion system according to claim 1, wherein the electric motors are powered by fuel cells.

8. An aircraft comprising at least one propeller-type propulsion system according to claim 1.

9. A propeller-type propulsion system for aircraft, having:
   a propeller;
   a plurality of electric motors, each comprising an output shaft;
   a gearbox having an output shaft onto which the propeller is mechanically coupled, and having an input shaft onto which the plurality of electric motors is mechanically coupled, the input shaft being off-center with respect to the gearbox output shaft; and
   wherein all of the electric motors are mechanically coupled one after the other along the input shaft such that the electric motors are entirely installed in a space, on an opposite side of the gearbox from the propeller, that is left free owing to the input shaft and the output shaft being off-center with respect to one another, the electric motors being moreover arranged in such a way that:
       output shafts of the electric motors are perpendicular to the input shaft, each output shaft comprising a first conical gearwheel mechanically coupled to a second conical gearwheel on the input shaft, the first conical gearwheel and the second conical gearwheel therefore being in perpendicular respective planes.

10. The propeller-type propulsion system according to claim 9, wherein the electric motors are arranged in a line.

11. The propeller-type propulsion system according to claim 9, wherein the electric motors are arranged on either side of a vertical plane passing through an axis of rotation of the input shaft.

12. The propeller-type propulsion system according to claim 9, wherein the electric motors are mechanically coupled in a freewheel arrangement with the input shaft.

13. The propeller-type propulsion system according to claim 9, wherein the input shaft is mechanically coupled in a freewheel arrangement with the output shaft.

14. The propeller-type propulsion system according to claim 9, further comprising a housing for controlling an orientation of blades of the propeller, this housing being placed in continuation of the output shaft, on the opposite side of the gearbox from the propeller.

15. The propeller-type propulsion system according to claim 9, wherein the electric motors are powered by fuel cells.

16. An aircraft comprising at least one propeller-type propulsion system according to claim 9.

17. A propeller-type propulsion system for aircraft, having:
   a propeller;
   a plurality of electric motors, each comprising an output shaft;
   a gearbox having an output shaft onto which the propeller is mechanically coupled, and having an input shaft onto which the plurality of electric motors is mechanically coupled, the input shaft being off-center with respect to the gearbox output shaft; and
   wherein all of the electric motors are mechanically coupled one after the other along the input shaft such that the electric motors are entirely installed in a space, on an opposite side of the gearbox from the propeller, that is left free owing to the input shaft and the output shaft being off-center with respect to one another, the electric motors being moreover arranged in such a way that:

output shafts of the electric motors are parallel to the input shaft, each output shaft comprising a first gearwheel mechanically coupled to a second gearwheel on the input shaft, the first gearwheel and the second gearwheel being coplanar, or output shafts of the electric motors are perpendicular to the input shaft, each output shaft comprising a first conical gearwheel mechanically coupled to a second conical gearwheel on the input shaft, the first conical gearwheel and the second conical gearwheel therefore being in perpendicular respective planes.

\* \* \* \* \*